United States Patent [19]

Warren

[11] Patent Number: 4,837,084

[45] Date of Patent: Jun. 6, 1989

[54] THERMOPLASTIC MULTI-LAYER PACKAGING FILM AND BAGS MADE THEREFROM

[75] Inventor: Thomas C. Warren, Greer, S.C.

[73] Assignee: W. R. Grace & Co.-Conn., Duncan, S.C.

[21] Appl. No.: 68,997

[22] Filed: Jul. 2, 1987

[51] Int. Cl.$^4$ .............................................. B32B 27/00
[52] U.S. Cl. .................... 428/349; 428/352; 428/516; 428/520
[58] Field of Search ............... 428/516, 35, 520, 349, 428/35.2

[56] References Cited

U.S. PATENT DOCUMENTS

| | | | |
|---|---|---|---|
| 3,022,543 | 2/1962 | Baird, Jr. et al. | 260/91.7 |
| 3,741,253 | 6/1973 | Brax et al. | 425/516 |
| 3,821,182 | 6/1974 | Baird, Jr. et al. | 260/91.7 |
| 4,064,296 | 12/1977 | Bornstein et al. | 428/35 |
| 4,076,698 | 2/1978 | Anderson et al. | 526/348.6 |
| 4,048,428 | 9/1977 | Baird, Jr. et al. | 526/343 |
| 4,188,443 | 2/1980 | Mueller et al. | 428/216 |
| 4,194,039 | 3/1980 | Mueller | 428/213 |
| 4,274,900 | 7/1981 | Mueller et al. | 156/229 |
| 4,299,241 | 11/1981 | Seiller | 132/48 |
| 4,457,960 | 7/1984 | Newsome | 428/35 |
| 4,597,920 | 7/1986 | Golike | 264/22 |
| 4,617,241 | 10/1986 | Mueller | 428/516 |
| 4,640,856 | 2/1987 | Ferguson et al. | 428/36 |
| 4,652,490 | 3/1987 | Arita et al. | 428/516 |
| 4,720,427 | 1/1988 | Clauson et al. | 428/516 |

FOREIGN PATENT DOCUMENTS

| | | |
|---|---|---|
| 120503 | 3/1084 | European Pat. Off. |
| 217252 | 9/1985 | European Pat. Off. |

OTHER PUBLICATIONS

"Introducing Very Low Density PE", Plastics Technology, Sep. 1984, p. 113.

"New Kind of Polyethylene Combines Flexibility, Toughness, Heat Resistance", Plastics Technology, Oct. 1984, p. 13.

"Stamylex PE", Brochure from Dutch State Mines, Feb. 1984.

*Primary Examiner*—Edith Buffalow
*Attorney, Agent, or Firm*—John J. Toney; William D. Lee, Jr.; Jennifer L. Skord

[57] ABSTRACT

Disclosed is a heat-shrinkable film suitable for making bags and pouches. The film has at least one layer comprising a copolymer of ethylene and an alphaolefin with six or more carbon atoms per molecule, said copolymer having a density of about 0.910 g/cc of less and a melt index of about 2 or less.

17 Claims, No Drawings

THERMOPLASTIC MULTI-LAYER PACKAGING FILM AND BAGS MADE THEREFROM

The invention relates to thermoplastic, multi-layer, heat-shrinkable (i.e. oriented), packaging films and bags or pouches made therefrom. In particular this invention relates to films and bags having excellent heat-shrinkability properties, orientation speed properties, and abuse-resistance properties.

Heat-shrinkable thermoplastic films are being used in packaging of non-food and food products like meat, cheese, poultry and the like. Many attempts have been made to combine good abuse-resistance or strength at all temperatures with good shrink properties and also to orient the films at a faster speed; however, there is still room for improvement.

BACKGROUND OF THE INVENTION

A film known from U.S. Pat. No. 3,741,253 to Brax comprises a core layer of a vinylidene chloride copolymer (saran) between a layer of ethylene-vinyl acetate copolymer and layer of a cross-linked ethylene-vinyl acetate copolymer. Ethylene-vinyl acetate copolymer (EVA) has some improved properties over the previously used polyethylene. Vinylidene chloride copolymers are known barrier materials to fluids such as oxygen.

As disclosed in U.S. Pat. No. 4,064,296 to Bornstein the core layer may also be a hydrolized ethylene-vinyl acetate copolymer (EVOH). It has similar oxygen barrier properties as vinylidene chloride copolymers and offers the advantage that it may be irradiated without discoloration, which is further discussed below.

Blends of linear low density polyethylene and ethylene vinyl acetate copolymer in oriented barrier films are disclosed in U.S. Pat. No. 4,457,960 to Newsome, which claims an oriented multiple layer polymeric film, comprising (a) a first barrier layer, said first layer having two opposing surfaces; (b) a second layer adhered to one said surface, said second layer being 10% to 90% linear low density polyethylene and 90% to 10% ethylene vinyl acetate; and (c) a third layer adhered to the other said surface, the composition of said third layer being selected from the group consisting of (i) ethylene vinyl acetate, and (ii) blends of 10% to 90% linear low density polyethylene with 90% to 10% ethylene vinyl acetate.

The so called linear low density polyethylenes are copolymers of ethylene and varying amounts of higher alpha-olefins with e.g. 5 to 10 carbon atoms per molecule (U.S. Pat. No. 4,076,698) or 3 to 8 carbon atoms per molecule (Published European patent application 120503 published Oct. 3, 1984, assigned to Union Carbide), for example copolymers of ethylene and butene-1, copolymers of ethylene and octene-1, and the like. Depending on their density these materials are referred to as linear low density polyethylene (LLDPE) or very low density linear polyethylene (VLDPE), the separation line being at a density of about 0.910 g/cc. Some properties of VLDPE have been described in Plastics Technology, September 1984, page 113. In October 1984, on page 13 of Plastics Technology, was another article describing VLDPE entitled "New Kind of Polyethylene Combines Flexibility, Toughness, Heat Resistance". The article lists a number of the properties of VLDPE and compares them with EVA. VLDPE is also described in a company brochure published in February 1984 by DSM in the Netherlands and entitled "Stamylex PE". Their properties are said to be a unique combination between those of standard polyethylene and polyolefinic rubbers. Their sealability and their compatibility with other polymers has been mentioned.

U.S. Ser. No. 911,936, which corresponds to Published European patent application No. 0217252 published on Apr. 8, 1987, commonly assigned to W. R. Grace, discloses a thermoplastic, multilayer, packing film having superior heat shrink and cold seal properties. Optionally, the film has a barrier layer. The sealing layer of the film comprises a copolymer of ethylene and higher alpha-olefin said copolymer having a density less than about 0.920 g/cm$^3$. Specifically, when using a copolymer of ethylene and butene, the comonomer content should be between about 10 and 20% by weight, based on the copolymer. Such copolymers have a density of less than about 0.915 g/cm$^3$. When employing a copolymer of ethylene and octene, the comonomer content should preferably be increased to between about 12 and 25% by weight, based on the copolymer. Such copolymers have a density of less than 0.920 g/cc. It is also possible to blend the ethylene/alpha-olefin copolymer with up to 50% by weight, based on the sealing layer composition, of a polymer which is compatible with said ethylene/alpha-olefin copolymer. Such further polymer may preferably be selected from linear low density polyethylene (LLDPE) with a density above 0.920 g/cc, linear high density polyethylene (LHDPE), low density polyethylene (LDPE), ethylene vinyl acetate (EVA), acid modified EVA, polypropylene, ethylene/propylene copolymers, ionomeric polymers, and ethylene/alkyl-acrylate (EAA) copolymers wherein the alkyl moiety has 1 to 8 C atoms, in particular ethylene/methyl-acrylate (EMA), ethylene/ethyl-acrylate (EEA) and ethylene/butyl-acrylate (EBA). The ethylene/alkyl-acrylate copolymer which can be blended with the ethylene/alpha-olefin in the heat sealing layer can comprise about 3 to 30% by weight of alkyl acrylate. In order to achieve optimal results as per U.S. Ser. No. 911,936, the comonomer content must increase when going from the C$_4$ alpha-olefin (butene(1)) to the C$_8$ alpha-olefin (octene(1)).

U.S. Pat. No. 4,640,856 to Ferguson et al, commonly assigned to W. R. Grace, discloses a multi-layer, thermoplastic barrier film having at least three layers comprising: (a) a layer consisting essentially of very low density polyethylene having a density of less than 0.910 gms/cc; (b) a barrier layer comprising a material selected from the group consisting of: (1) copolymers of vinylidene chloride and (2) hydrolyzed ethylene-vinyl acetate copolymers; (c) a thermoplastic polymeric layer, said layer being on the side of the barrier layer opposite to that of layer (a); and (d) the shrinkage of layer (a) controlling the shrinkage of the entire multilayer barrier film, said multi-layer film having been oriented and rendered heat shrinkable at a temperature below 100° C. (212° F.), said orientation temperature being about 40° F. or more below the melt temperature of said very low density polyethylene.

U.S. Pat. No. 4,597,920 to Golike, assignor to du Pont, (July, 1986) discloses a process for making a shrink film by stretching biaxially, without prior crosslinking, a film made of a copolymer of ethylene with at least one C$_8$–C$_{18}$ alpha-olefin, which copolymer has two distinct crystallite melting points below 128° C., the difference between these melting points being at least 10° C., and stretching being carried at a temperature within the range defined by these melting points.

It is an object of the present invention to provide a packaging film and bags made therefrom which have excellent or improved orientation characteristics over those of the materials used in the past. This means that the orientation speed during processing should be faster.

It is a further object of this invention to provide a packaging film and bags made therefrom which have excellent heat-shrinkability characteristics compared to those of materials used in the past.

It is a further object of this invention to provide a packaging film and bags made therefrom having the above two characteristics and also having excellent abuse resistance or strength, as compared to materials used in the past and thereby provide a minimal risk of breakages when bags made of the film material are utilized in automated loading processes.

Finally and most importantly it is an object of this invention to provide a material for films and bags combining the three above advantages, i.e. excellent shrinkability characteristics, excellent orientation characteristics, and excellent abuse resistance.

SUMMARY OF THE INVENTION

Therefore, the present invention provides a thermoplastic, multi-layer, heat-shrinkable packaging film comprising at least one layer of a copolymer of ethylene and an alpha-olefin with 6 or more carbon atoms per molecule, said ethylene/alpha-olefin copolymer having a density of about 0.910 g/cc or less and a melt index of about 2 or less.

The invention also provides a thermoplastic, multi-layer, heat-shrinkable packaging film having excellent abuse resistance, shrink and orientation properties comprising an outside polymer layer, a heat sealing layer and an interior layer between said sealing and said outside layers, wherein said interior layer comprises a copolymer of ethylene and an alpha-olefin with 6 or more carbon atoms per molecule, said ethylene/alpha-olefin copolymer having a density of about 0.910 g/cc or less and a melt index of about 2 or less.

The invention also provides a process for manufacturing thermoplastic, multi-layer, heat-shrinkable packaging film comprising (I) extruding at least one layer of a copolymer of ethylene and an alpha-olefin with 6 or more carbon atoms per molecule, said ethylene/alpha-olefin copolymer having a density of about 0.910 g/cc or less and a melt index of about 2 or less, (II) orienting the extruded polymer in at least one direction, and (III) recovering a heat shrinkable polymeric film.

In another aspect the invention also provides side sealed and/or end sealed bags made from the abovementioned inventive film.

DETAILED DESCRIPTION OF THE INVENTION

Suitable ethylene/alpha-olefin copolymers, for use in at least one layer of the multilayer, heat-shrinkable films of the invention, belong to the class of polymers known as very low density linear polyethylene (VLDPE). VLDPE is further discussed below. The VLDPE's suitable for use in the films of the invention have a density of about 0.910 g/cc or less, a melt index of about 2 or less, and an alpha-olefin comonomer with 6 or more carbon atoms. Such comonomers include, but are not limited to 4-methyl-pentene-1, hexene-1, and octene-1.

Some of the commercially available suitable VLDPE's are the XPR0545 series of resins supplied by Dow, XU61512.08L resin supplied by Dow, and DEFD 1629 resin supplied by Union Carbide. This VLDPE preferably is present in an interior layer of the multilayer film. Optionally, the films of the invention have a barrier layer such as a layer of EVOH or saran.

Typically, in the manufacture of films, a suitable polymer usually in the form of pellets or the like, is brought into a heated area where the polymer feed is melted and heated to its extrusion temperature and extruded as a tubular "blown bubble" through an annular die. Other methods, such as "slot die" extrusion wherein the resultant extrudate is in planar, as opposed to tubular, form are also well known. If heat shrinkable film is desired, then after extrusion, the film is typically cooled and stretched, i.e. oriented by "tenter framing" or by inflating with a "trapped bubble", to impart the heat-shrinkable property to the film, as is further described below. If desired, irradiation, typically via an electron beam, may take place after but preferably takes place prior to the stretching for orienting the film. However, for the present invention, such irradiation is not necessary since a very suitable packaging film is obtained without irradiation. Below, first is described in detail the general process for making and orienting film. Then irradiation is described in detail.

More particularly, the manufacture of shrink, i.e. oriented, films may be generally accomplished by extrusion (single layer films) or coextrusion (multi-layer films) of thermoplastic resinous materials which have been heated to or above their flow or melting point from an extrusion or coextrusion die in, for example, either tubular or planar (sheet) form, followed by a post extrusion cooling. The stretching for orienting the film may be conducted at some point during the cool down while the film is still hot and at a temperature within its orientation temperature range, followed by completing the cooling. Alternatively, after the post extrusion cooling, the relatively thick "tape" extrudate is then reheated to a temperature within its orientation temperature range and stretched to orient or align the crystallites and/or molecules of the material, and then cooled again. The orientation temperature range for a given material or materials will vary with the different resinous polymers and/or blends thereof which comprise the material. However, the orientation temperature range for a given thermoplastic material may generally be stated to be below the crystalline melting point of the material but above the second order transition temperature (sometimes referred to as the glass transition point) thereof. Within this temperature range, the material may be effectively stretched to provide a heat-shrinkable film.

The terms "orienting" or "oriented" are used herein to describe generally the process steps and resultant product characteristics obtained by stretching, transversely, longitudinally, or both (whether during the post extrusion cool down or during reheating after the post extrusion cool down as described in the paragraph above) and substantially immediately cooling a resinous thermoplastic polymeric material which has been heated to a temperature within its orientation temperature range so as to revise the intermolecular configuration of the material by physical alignment of the crystallites and/or molecules of the material to improve certain mechanical properties of the film such as, for example, shrink tension and release stress. Both of these properties may be measured in accordance with ASTM D 2838-81. When the stretching force is applied in one direction, monoaxial orientating results. When the stretching force is applied in two directions, biaxial orientating results. The term oriented is also herein used interchangeably with the term "heat-shrinkable" with these terms designating a material which has been stretched and set by cooling while substantially retaining its stretched dimensions. An oriented (i.e. heat-shrinkable) material will tend to return to its original unstretched (unextended) dimensions when heated to an appropriate elevated temperature. However, by "orientation characteristics or properties" as that term is used herein, it is specifically intended to mean the orientation speed during processing in making the oriented film. When it is intended to refer to the percent shrink of the film and bags made therefrom, then the term "heat-shrinkability characteristics or properties" or the term "shrink characteristics or properties" is employed herein.

Returning to the basic process for manufacturing film as discussed above, it can be seen that the film, once extruded (or coextruded if it is a multi-layer film), is then oriented by stretching within its orientation temperature range. The stretching to orient may be accomplished in many ways such as, for example, by "trapped bubble" techniques or "tenter framing". These processes are well known to those in the art and refer to orienting procedures whereby the material is stretched in the cross or transverse direction (TD) and/or in the longitudinal or machine direction (MD). After being stretched, the film is quickly cooled while substantially retaining its stretched dimensions to cool the film rapidly and thus set or lock-in the oriented molecular configuration.

The film which has been made may then be stored in rolls and utilized to package a wide variety of items. If the material was manufactured by "trapped bubble" techniques the material may still be in tubular form or it may have been slit and opened up to form a sheet of film material. In this regard, a product to be packaged may first be enclosed in the material by heat sealing the film to itself where necessary and appropriate to form a pouch or bag and then inserting the product therein. Alternatively, a sheet of the material may be utilized to overwrap the product. These packaging methods are all well known to those of skill in the art.

When a material is of the heat-shrinkable (i.e. oriented) type, then after wrapping, the enclosed product may be subjected to elevated temperatures, for example, by passing the enclosed product through a hot air tunnel or by placing the enclosed product in hot water. This causes the enclosing heat shrinkable film to shrink around the product to produce a tight wrapping that closely conforms to the contour of the product. As stated above, the film sheet or tube may be formed into bags or pouches and thereafter utilized to package a product. In this case, if the film has been formed as a tube it may be preferable first to slit the tubular film to form a film sheet and thereafter form the sheet into bags or pouches. Such bags or pouches forming methods, likewise, are well known to those of skill in the art.

The above general outline for manufacturing of films is not meant to be all inclusive since such processes are well known to those in the art. For example, see U.S. Pat. Nos. 4,274,900; 4,299,241; 4,194,039; 4,188,443; 4,048,428, 3,821,182 and 3,022,543. The disclosures of these patents are generally representative of such processes and are hereby incorporated by reference.

Alternative methods of producing films of this type are known to those in the art. One well-known alternative is the method of forming a multi-layer film by an extrusion coating in combination with an extrusion or coextrusion process as was discussed above. In extrusion coating a first tubular layer or layers is extruded and thereafter an additional layer or layers is simultaneously or sequentially coated onto the outer surface of the first tubular layer or a successive layer. Exemplary of this method is U.S. Pat. No. 3,741,253. This patent is generally representative of an extrusion coating process and is hereby incorporated by reference.

Many other process variations for forming films are well known to those in the art. For example, conventional thermoforming or laminating techniques may be employed. For instance, multiple substrate layers may be first coextruded via a blown bubble tube with additional layers thereafter being extrusion coated or laminated thereon, or two multi-layer tubes may be coextruded with one of the tubes thereafter being extrusion coated or laminated onto the other.

In the preferred embodiments as illustrated in the examples below, the multi-layer film of the invention contains a barrier layer. The layer is a barrier to fluids such as gas. The barrier layer may be composed of a layer comprising vinylidene chloride copolymer (commonly known as saran), or composed of a layer comprising hydrolyzed ethylene-vinyl acetate copolymer (EVOH), preferably hydrolyzed to at least about 50%, most preferably to greater than about 99%, or composed of both a layer comprising vinylidene chloride copolymer and a layer comprising EVOH. When the barrier layer is composed of a layer comprising EVOH, the mole percent of vinyl acetate prior to hydrolysis should be at least about 29%, since for lesser amounts the effectiveness of the hydrolyzed copolymer as a barrier to fluids such as gas is substantially diminished. It is further preferred that the barrier copolymer have a melt flow being generally compatible with that of the other components of the multi-layer film, preferably in the range of about 3–10 (melt flow being determined generally in accordance with ASTM D1238). The gas of main concern is oxygen and transmission is considered to be sufficiently low, i.e. the barrier material is relatively gas impermeable, when the transmission rate is below 70 $cc/m^2$/mil thickness/24 hours/atms, as measured according to the procedures of ASTM Method D-1434. The barrier layer of the multi-layer barrier shrink film according to the barrier film embodiment of the present invention has a transmission rate below this value. EVOH can be advantageously utilized in the film of the invention since irradiative high energy electron treatment of the fully coextruded film does not degrade an EVOH barrier layer, as could be the case for a vinylidene chloride copolymer barrier layer.

When, as further discussed below, a vinylidene chloride copolymer (PVDC) is employed instead of or together with EVOH as the barrier layer, then the irradiation preferably should take place prior to application of the saran layer to avoid degradation thereof. This application may be achieved by well known extrusion coating methods, as discussed above. More particularly, the extrusion coating method of film formation is preferable to coextruding the entire film when it is desired to subject one or more layers of the film to a treatment which may be harmful to one or more of the other layers.

Exemplary of such a situation is a case where it is desired to irradiate with high energy electrons one or more layers of a film containing a barrier layer comprised of one or more copolymers of vinylidene chloride (i.e. saran), such as of vinylidene chloride and acrylonitrile or such as of vinylidene chloride and vinyl chloride or such as of vinylidene chloride and methyl acrylate. In other words, the barrier layer includes a saran layer in addition to or instead of an EVOH layer. Those of skill in the art generally recognize that irradiation with high energy electrons is generally harmful to such saran barrier layer compositions, as irradiation may degrade and discolor saran, making it turn brownish. Thus, if full coextrusion and orientation followed by high energy electron irradiation of the multi-layer structure is carried out on a film having a saran layer, the irradiation should be done at low levels with care. Alternatively, this situation may be avoided by using extrusion coating. Accordingly, by means of extrusion coating, one may first extrude or coextrude a first layer or layers, subject that layer or layers to high energy electron irradiation and thereafter extrusion coat the saran barrier layer and, for that matter, simultaneously or sequentially extrusion coat other later layers (which may or may not have been irradiated) onto the outer surface of the extruded previously irradiated tube and then orient the resultant. This sequence allows for the irradiative treatment of the first and later layer or layers without subjecting the saran barrier layer to the harmful discoloration effects thereof.

Irradiation may be accomplished by the use of high energy electrons, ultra violet radiation, X-rays, gamma rays, beta particles, etc. Preferably, electrons are employed up to about 20 megarads (RD) dosage level. The irradiation source can be any electron beam generator operating in a range of about 150 kilovolts to about 6 megavolts with a power output capable of supplying the desired dosage. The voltage can be adjusted to appropriate levels which may be for example 1,000,000 and 2,000,000 or 3,000,000 or 6,000,000 or higher or lower. Many apparatus for irradiating films are known to those of skill in the art. The irradiation is usually carried out at a dosage up to about 20 MR, typically between about 1 MR and about 20 MR, with a preferred dosage range of about 2 MR to about 12 MR. Irradiation can be carried out conveniently at room temperature, although higher and lower temperatures, for example, 0° C. to 60° C. may be employed.

In the Examples below the multi-layer films were made by a conventional method of manufacturing, combining tubular coextrusion (colloquially called the hot blown bubble technique) with extrusion coating to achieve an oriented (heat-shrinkable) film. A tubular process was utilized wherein a coextruded tube of a multi-layer substrate core was extrusion coated with saran and another layer simultaneously, then the resultant structure was cooled and collapsed, and then reheated and biaxially stretched in the transverse direction and in the longitudinal machine direction via inflating the tube with a bubble. Then the stretched bubble was cooled and collapsed, and the deflated oriented film wound up as flattened, seamless, tubular film to be used later to make bags, overwrap, et cetera. Prior to the coating of the saran layer and the additional layer, the substrate core was guided through an ionizing radiation field; for example, through the beam of an electron accelerator to receive a radiation dosage in the range of about 4 to 6 megarads (MR).

The VLDPE having a comonomer with 6 or more carbon atoms, a density of about 0.910 g/cc or less and a MI of about 2 or less may be blended with one or more various other polymers, said one or more other polymers being present in a weight amount up to about 50%, more preferably about 35%, most preferably about 25%. These various other polymers also may be employed for the inner heat sealing layer of the preferred multi-layer barrier films of the present invention. Many of these other polymers are also suitable for use in any other layers of the films of the present invention, whether or not the films are barrier films. Suitable other polymers include, but are not limited to, ethylene vinyl acetate (EVA) copolymers, LLDPE, LDPE, HDPE, MDPE, polypropylene, ethylene/propylene copolymers, ethylene/alkyl-acrylate copolymers (EAA) [such as ethylene/methyl-acrylate (EMA), ethylene/ethyl-acrylate (EEA), and ethylene/butyl-acrylate (EBA)], acid modified EVA, copolymers of (i) and (ii) where (i) is an alpha-olefin of the formula $RHC=CH_2$ wherein R is H or $C_1$ to $C_8$ alkyl and (ii) is an alpha,beta-ethylenically unsaturated carboxylic acid, and the like and mixtures thereof. Preferably, in the $RHC=CH_2$ copolymer of an olefin and a carboxylic acid, the olefin is ethylene and the carboxylic acid is acrylic acid or methacrylic acid. Materials, which are the copolymer of an alpha-olefin having the formula $RHC=CH_2$ wherein R is H or $C_1$ to $C_8$ alkyl and an alpha,beta-ethylenically unsaturated carboxylic acid, representatively may be one of the Primacor TM polymers, supplied by Dow Chemical Company, Midland, Mich. Primacor is produced by the free radical copolymerization of ethylene and a carboxylic acid comonomer therefor such as acrylic acid or methacrylic acid. Also, the copolymer of an alpha-olefin having the formula $RHC=CH_2$ wherein R is H or $C_1$ to $C_8$ alkyl and an alpha,beta-ethylenically unsaturated carboxylic acid may be metal salt neutralized such as with sodium, Na. Thus, the copolymer may be an ionomer. Representatively, such an ionomeric material is commercially available as Surlyn TM from the E. I. du Pont de Nemours Company of Wilmington, Del., and is described in detail in U.S. Pat. Nos. 3,355,319 and 3,845,163.

In general, these polymers mentioned in the paragraph above may be blended with each other, and are many of the materials which as per published EP No. 0217252 mentioned above may be blended in a weight amount up to 50%, based on the sealing layer, with the copolymer of ethylene and higher alpha-olefin having a density less than 0.920 g/cc.

DEFINITIONS

The term "saran" or "PVDC", as used herein, refers to a vinylidene chloride copolymer wherein a major amount of the copolymer comprises vinylidene chloride and a minor amount of the copolymer comprises one or more unsaturated monomers copolymerizable therewith. Examples of unsaturated monomers copolymerizable with the vinylidene chloride are vinyl chloride, acrylonitrile, and alkyl acrylates having 1 to 18 carbon atoms in the alkyl group.

As used herein the term "extrusion" or the term "extruding" is intended to include coextrusion, extrusion coating, or combinations thereof, whether by tubular methods, planar methods, or combinations thereof.

An "oriented" or "heat shrinkable" material is defined herein as a material which, when heated to an appropriate temperature above room temperature (for example 96° C.), will have a free shrink of about 5% or greater in at least one linear direction.

Unless specifically set forth and defined or otherwise limited, the terms "polymer" or "polymer resin" as used herein generally include, but are not limited to, homopolymers, copolymers, such as, for example block, graft, random and alternating copolymers, terpolymers, etc. and blends and modifications thereof. Furthermore, unless otherwise specifically limited the term "polymer" or "polymer resin" shall include all possible molecular configurations of the material. These structures include, but are not limited to, isotactic, syndiotactic and random molecular configurations.

The term "polyethylene" as used herein, which "polyethylene" is employed in the film of the invention, refers to families of resins obtained by substantially polymerizing the gas ethylene, $C_2H_4$. By varying the comonomers, catalysts and methods of polymerization, properties such as density, melt index, crystallinity, degree of branching, molecular weight and molecular weight distribution can be regulated over wide ranges. Further modifications are obtained by other processes, such as halogenation, and compounding additives. Low molecular weight polymers of ethylene are fluids used as lubricants; medium weight polymers are waxes miscible with paraffin; and the high molecular weight polymers are resins generally used in the plastics industry. Polyethylenes having densities ranging from about 0.900 g/cc to about 0.935 g/cc are called low density polyethylenes (LDPE) while those having densities from about 0.935 g/cc to about 0.940 g/cc are called medium density polyethylenes (MDPE), and those having densities from about 0.941 g/cc to about 0.965 g/cc and over are called high density polyethylenes (HDPE). The older, classic low density types of polyethylenes are usually polymerized at high pressures and temperatures whereas the older, classic high density types are usually polymerized at relatively low temperatures and pressures.

The term "linear low density polyethylene" (LLDPE) as used herein, refers to the newer copolymers of a major amount of ethylene with a minor amount of one or more comonomers selected from $C_3$ to about $C_{10}$ or higher alpha-olefins such as butene-1, pentene-1, hexene-1, octene-1, etc. in which the molecules thereof comprise long chains with few side chains or branched structures achieved by low pressure polymerization. The side branching which is present will be short as compared to non-linear polyethylenes. The molecular chains of a linear polymer may be intertwined, but the forces tending to hold the molecules together are physical rather than chemical and thus may be weakened by energy applied in the form of heat. Linear low density polyethylene has a density preferably in the range from about 0.911 g/cc to about 0.935 g/cc, more preferably in the range of from about 0.912 g/cc to about 0.928 g/cc for film making purposes. The melt flow index of linear low density polyethylene generally ranges from between about 0.1 to about 10 grams per ten minutes and preferably between from about 0.5 to about 3.0 grams per ten minutes. LLDPE resins of this type are commercially available and are manufactured in low pressure vapor phase and liquid phase processes using transition metal catalysts. The very low density linear low density polyethylenes (VLDPE) have a density from about 0.910 g/cc to about 0.860 g/cc, or even lower.

The term "ethylene vinyl acetate copolymer" (EVA) as used herein refers to a copolymer formed from ethylene and vinyl acetate monomers wherein the ethylene derived units in the copolymer are present in major amounts and the vinyl acetate (VA) derived units in the copolymer are present in minor amounts. For film forming purposes, it is desirable that the VA content of the EVA be from about 3% to about 25%.

The term "ethylene/alkyl-acrylate copolymer" (EAA) as used herein refers to a copolymer formed from ethylene and alkyl acrylate wherein the alkyl moiety has 1 to 8 carbon atoms and the ethylene derived units in the copolymer are present in major amounts and the alkyl-acrylate derived units in the copolymer are present in minor amounts. Thus, the term "ethylene/methyl acrylate copolymer" (EMA) as used herein for a type of polyethylene, refers to a copolymer formed from ethylene and methyl acrylate monomers. The term "ethylene/ethyl acrylate copolymer" (EEA) as used herein for a type of polyethylene, refers to a copolymer formed from ethylene and ethyl acrylate monomers. The term "ethylene/butyl acrylate copolymer" (EBA) as used herein for a type of polyethylene, refers to a copolymer formed from ethylene and butyl acrylate monomers. Many suitable EBA's are commercially available and these have a butyl acrylate content from about 3% up to about 18% by weight. USI is a commercial supplier of Resin No. 4895, which is an EBA having about 3% by weight butyl acrylate and a melt index of 3 and a melting point of about 106° to 107° C.

The following Examples are intended to illustrate the preferred embodiments of the invention and comparisons thereto. It is not intended to limit the invention thereby.

MATERIALS EMPLOYED IN THE EXAMPLES

A suitable adhesive type of polymer employed in the films of the invention is commercially available as Bynel CXA 3101. It is an ethylene-based adhesive with a combination of ester and acid comonomer functionally, (i.e. an acid-modified EVA) and is supplied by du Pont.

Some of the LLDPE employed in the examples was Dowlex 2045.03 having a melt index of 1.1 and a density of 0.920. It was supplied by Dow Chemical. The comonomer is octene.

Some of the LLDPE employed in the examples was Dowlex 4002 LLDPE having a melt index of 3.3 and a density of 0.912, and some was Dowlex 4001 LLDPE having a melt index of 1 and a density of 0.912. Both were supplied by Dow Chemical. For both, the comonomer is octene.

Some of the LLDPE employed in the Examples was Dowlex XU 61502.36 LLDPE having a melt index of 1 and a density of 0.917. It was supplied by Dow Chemical. The comonomer is octene.

Some of the LLDPE employed in the Examples was HS 7028 having a melt index of 1.0 and a density of 0.918. It was supplied by Union Carbide. The comonomer is hexene-1.

Some of the LLDPE employed in the Examples was LL3301.CR1 having a melt index of 1.0 and a density of 0.918. It was supplied by Exxon. The comonomer is hexene-1.

The HDPE employed in the Examples was Alathon 7850, having melt index of 18 and a density of 0.960. It was supplied by du Pont.

Some of the VLDPE employed in the Examples was XPR0545-36568-5N having a melt index of 0.8 and a density of 0.901. The comonomer is octene-1. It was supplied by Dow Chemical.

Some of the VLDPE employed in the Examples was XPR0545-36568-6A, having a melt index of 0.8 and a density of 0.905. The comonomer is octene-1. It was supplied by Dow Chemical.

Some of the VLDPE employed in the Examples was XPR0545-36568-6E, having a melt index of 0.8 and a density of 0.910. The comonomer is octene-1. It was supplied by Dow Chemical.

Dow XU 61512.08L is a VLDPE supplied by Dow Chemical. It has octene as the comonomer. The density=0.905 and MI=0.80.

Some of the VLDPE employed in the Examples was DEFD 1491, having melt index of 1.0, and a density of 0.900. The comonomer is butene-1. It was supplied by Union Carbide.

Some of the VLDPE employed in the Examples was XPR0545-36568-12D having a melt index of 0.8 and a density of 0.900. The comonomer is octene-1. It was supplied by Dow Chemical.

Some of the VLDPE employed in the Examples was XPR0545-36568-12E, having a melt index of 0.8 and a density of 0.905. The comonomer is octene-1. It was supplied by Dow Chemical.

Some of the VLDPE employed in the Examples was XPR0545-36568-12F, having a melt index of 0.8 and a density of 0.910. The comonomer is octene-1. It was supplied by Dow Chemical.

Some of the VLDPE was XPR0545-36568-12G. It was supplied by Dow Chemical. It has octene as the comonomer. The density=0.900 and MI=0.60.

Some of the VLDPE employed in the examples was XPR-0545-33260-46L having a melt index of 3.3 and a density of 0.907–0.908. The comonomer is octene-1. It is supplied by Dow Chemical.

Some of the LLDPE and VLDPE employed was of the Stamylex resins supplied by Dutch State Mines. The comonomer is octene. Each has a melt index and density as follows: Stamylex 1016, MI=1.1, density=0.920; Stamylex 1026, MI=2.2, density=0.920; Stamylex 08-026 026, MI=2.2, density=0.911; Stamylex 2H287, MI=2.2, density=0.906; Stamylex 2H286, MI=2.2, density=0.902.

Some of the LLDPE employed was of the DEFD resins supplied by Union Carbide. The comonomer is hexene-1. Each has a melt index and density as follows: DEFD1568, MI=0.50, density=0.913; DEFD 1569, MI=1.0, density=0.912; DEFD 1623, MI=1.0, density=0.915; DEFD 1624, MI=0.5, density=0.914; DEFD 1626, MI=0.8, density=0.911; DEFD 1627, MI=0.8, density=0.912; DEFD 1628, MI=0.8, density=0.915; DEFD 1630, MI=0.5, density=0.913; DEFD 1567, MI=1.0, density=0.913; DEFD 1565, MI=0.5, density=0.912.

Some of the VLDPE employed was of the DEFD 1629 supplied by Union Carbide. The comonomer of DEFD 1629 is hexene; MI=0.5; and density=0.910.

Some of the VLDPE employed in the Examples was 1137 having a melt index of 0.8 and a density of 0.906. Some was 1491 having a melt index of 1.0 and a density of 0.900. The comonomer of both is butene. Both were supplied by Union Carbide.

USI was the commercial supplier of Resin No. 4895, which was the EBA employed. It has about 3% by weight butyl acrylate (the butyl groups are normal butyl, not tert butyl) and a melt index of 3.

The saran employed in some of the laboratory examples was Ixan TM WV320 supplied by Solvay Corporation. It is a copolymer of vinylidene chloride with vinyl chloride.

Another saran (denoted in the examples below as Saran-MA) employed in some of the laboratory examples was XU32027.01, supplied by Dow Chemical. It is a copolymer of vinylidene chloride with methyl acrylate.

Some of the EVA employed in the laboratory examples was LD318.92, which is an EVA containing 9% vinyl acetate and having a melt index of 2.0. It was supplied by Exxon.

The EVA employed in some of the laboratory examples was LD720.62, which is an EVA containing 18% vinyl acetate and having a melt index of 1.5. It was supplied by Exxon.

Also employed was Elvax 3165, which is an EVA having 18% VA, and its MI=0.7. Some of the EVA employed in the examples was PE3508, which is an EVA having 12% VA and having a melt index of 0.35. Some of the EVA was PE 3507-1, which has 6% VA and a melt index of 2.7. These were supplied by du Pont.

EXAMPLES

Percentages indicated in the Examples were calculated as % by weight.

The films were made by first hot blowing through an annular die a two-layer extruded tube of the structure: LAYER 1/LAYER 2 as the substrate. Then with a two-ply die, a layer of saran (barrier layer 3) and another layer (outside layer 4) were extrusion coated on. The resultant 4-layer structure was then cooled and collapsed. The tube was then reheated and oriented by stretching via a trapped bubble 4:1 in the transverse direction and 3:1 in the longitudinal direction for an overall biaxial orientation of 12:1. When such films were made into bags, the heat sealing layer 1 was the "inner" or "inside" layer as it was the bag "inside", and "outside" layer 4 was the bag "outside". The test layer 2 and the barrier layer 3 were "interior" layers of the multi-layer film.

Where irradiation has been indicated in the samples, the two-layer substrate was irradiated at the MR indicated prior to the coating on of saran and the outer layer. Various properties, i.e. orientation speed, abuse resistance (Carson Dart Drop, or ball burst), and % shrink, were measured for the films as noted in the Tables below. It is noted that orientation speed, due to the fastest the equipment could be run, could not go any higher than 80 feet/minute. The ball burst and shrink were measured in accordance with procedures set out in ASTM D 3420 and ASTM D 2732, respectively.

The Carson Dart Drop is an impact test that measures the impact resistance of film by the free-falling dart method. The apparatus employed for the free-falling dart impact was as described in ASTM D 1709. The dart weighed about 41.5 grams. Film samples of about 7×7 inches (17.8×17.8 cm) were cut. Samples and equipment were allowed to equilibrate at room temperature for 36–40 hours prior to testing. Three specimens of each kind of film were sequentially placed in the clamp of the apparatus with the inside (layer 1 of the below films) of the sample up. A failure height was selected and the dart released. The height was lowered by 1 inch (2.54 cm) and testing of another three specimens repeated. The 1 inch lowering was successively repeated until all three samples did not break from the impact of the dart.

EXAMPLE I

Films having 4 layers were made and as indicated below, the polymers for Layer 2 were varied for the various films that were made, whereas the polymers for Layers 1, 3, and 4 were kept the same.

| | SUBSTRATE LAYERS | | EXTRUSION COATED LAYERS | |
|---|---|---|---|---|
| | SEALING LAYER 1 | LAYER 2* | BARRIER LAYER 3 | OUTSIDE LAYER 4 |
| Polymer: | EVA (9% VA) | EVA or LLDPE or VLDPE | SARAN | EVA (9% VA) |
| | [LD318.92] | | | [LD318.92] |
| Before Orientation Thickness: (mils)** | 3 | 14.5 | 3.5 | 6.5 |

*When EVA was employed (Control Sample 1), layer 2 was 100% EVA. But when LLDPE or VLDPE was employed (Samples 2-32), layer 2 was a blend of 7% Bynel CXA3101 and 93% LLDPE by weight or was a blend of 7% Bynel CXA3101 and 93% VLDPE by weight.
**After orientation, the total thickness of the 4-layer film was about 2.2 mils to about 2.5 mils.

TABLE I

| SAMPLE NUMBER AND IRRAD OF LAYERS 1 AND 2 (MR) | LAYER 2 | DENSITY g/cc | MI (dg/min.) | COMONOMER | ORIENTATION SPEED FT/MIN (M/MIN) | ABUSE RESISTANCE CARSON DART DROP INCHES (CM) | BALL BURST (CM-KG) (Room Temp) | % SHRINK 185° F. (85° C.) TRANSVERSE | LONGITUDINAL |
|---|---|---|---|---|---|---|---|---|---|
| CONTROL 1 COMPARISON (4.5 MR) | EVA (9% VA) [LD318.92] | | 2.0 | VINYL ACETATE | 57 (17.4) | 7.0 (17.8) | 25 | 44 | 27 |
| CONTROL 2A (4.5 MR) | LLDPE [DOWLEX 2045.03] | 0.920 | 1.10 | OCTENE | 46 (14.0) | 15.0 (38.1) | 44.8 | 34 | 23 |
| CONTROL 2B (4.5 MR) | LLDPE [DOWLEX 2045.03] | 0.920 | 1.10 | OCTENE | 51 (15.5) | 12.0 (30.5) | 32.0 | 32 | 22 |
| CONTROL 2C (4 MR) | LLDPE [DOWLEX 2045.03] | 0.920 | 1.10 | OCTENE | 56 (17.1) | 19 (48.3) | 36 | 28 | 16 |
| CONTROL 2D COMPARISON (6 MR) | LLDPE [DOWLEX 2045.03] | 0.920 | 1.10 | OCTENE | 60 (18.3) | 20 (50.8) | 41 | 28 | 18 |
| 3 COMPARISON (4.5 MR) | LLDPE [STAMYLEX 1016] | 0.920 | 1.10 | OCTENE | 53 (16.2) | 6.0 (15.2) | 20.9 | 45 | 35 |
| 4 COMPARISON (4.5 MR) | LLDPE [XU61502.36] | 0.917 | 1.00 | OCTENE | 55 (16.8) | 11.0 (27.9) | 35.0 | 32 | 17 |
| 5 COMPARISON (4.5 MR) | LLDPE [STAMYLEX 1026] | 0.920 | 2.20 | OCTENE | 44 (13.4) | 10.0 (25.4) | 29.5 | 31 | 18 |
| 6 COMPARISON (4.5 MR) | LLDPE [STAMYLEX 08-026] | 0.911 | 2.20 | OCTENE | 50 (15.2) | 8.0 (20.3) | 31.1 | 40 | 29 |
| 7A COMPARISON (4 MR) | VLDPE [XPR054-33260-46L] | 0.908 | 3.30 | OCTENE | 50 (15.2) | 10.0 (25.4) | 24.0 | 35 | 22 |
| 7B COMPARISON (6 MR) | VLDPE [XPR054-33260-46L] | 0.908 | 3.30 | OCTENE | 50 (15.2) | 10 (25.4) | 27 | 35 | 22 |
| 8 COMPARISON (6 MR) | VLDPE [STAMYLEX 2H287] | 0.906 | 2.20 | OCTENE | 56 (17.1) | 6.0 (15.2) | 23.4 | 41 | 29 |
| 9 COMPARISON (4.5 MR) | VLDPE [STAMYLEX 2H286] | 0.902 | 2.20 | OCTENE | 49 (14.9) | 10.0 (25.4) | 25.8 | 24 | 24 |
| 10 COMPARISON (4.5 MR) | VLDPE [XPR0545-36568-5N] | 0.900 | 0.80 | OCTENE | 70 (21.3) | 9.0 (22.9) | 32.0 | 45 | 30 |
| 11 (4.5 MR) | VLDPE [XPR0545-36568-6A] | 0.905 | 0.80 | OCTENE | 70 (21.3) | 10.0 (25.4) | 34.0 | 42 | 33 |
| 12 (4.5 MR) | VLDPE [XPR0545-36568-6E] | 0.910 | 0.80 | OCTENE | 65 (19.8) | 12.0 (30.5) | 36.0 | 38 | 26 |
| 13 (4.5 MR) | VLDPE [XU61512.08L] | 0.905 | 0.80 | OCTENE | 70 (21.3) | 10.0 (25.4) | 38.0 | 40 | 26 |
| 14 (4.5 MR) | VLDPE [XPR0545 36568-12D] | 0.900 | 0.80 | OCTENE | 74 (22.6) | 9.0 (22.9) | 31.0 | 40 | 26 |
| 15 (4.5 MR) | VLDPE [XPR0545 36568-12E] | 0.905 | 0.80 | OCTENE | 74 (22.6) | 10.0 (25.4) | 40.0 | 39 | 25 |
| 16 | VLDPE | 0.910 | 0.80 | OCTENE | 70 | 11.0 | 38.0 | 35 | 22 |

TABLE I-continued

| SAMPLE NUMBER AND IRRAD OF LAYERS 1 AND 2 (MR) | LAYER 2 | DENSITY g/cc | MI (dg/min.) | COMONOMER | ORIENTATION SPEED FT/MIN (M/MIN) | ABUSE RESISTANCE CARSON DART DROP INCHES (CM) | BALL BURST (CM-KG) (Room Temp) | % SHRINK 185° F. (85° C.) TRANSVERSE | % SHRINK 185° F. (85° C.) LONGITUDINAL |
|---|---|---|---|---|---|---|---|---|---|
| (4.5 MR) | [XPR0545 36568-12F] | | | | (21.3) | (27.9) | | | |
| 17 (4.5 MR) | VLDPE [XPR0545 36568-12G] | 0.900 | 0.60 | OCTENE | 78 (23.8) | 10 (25.4) | 29.0 | 40 | 26 |
| 18 (4.5 MR) | VLDPE [DEFD1629] | 0.910 | 0.50 | HEXENE | 65 (19.8) | 11.0 (27.9) | 31.0 | 36 | 23 |
| 19A COMPARISON (4 MR) | LLDPE [HS7028] | 0.918 | 1.00 | HEXENE | 45 (13.7) | 10.0 (25.4) | 26.0 | 28 | 19 |
| 19B COMPARISON (6 MR) | LLDPE [HS7028] | 0.918 | 1.00 | HEXENE | 48 (14.6) | 12 (30.5) | 28 | 28 | 18 |
| 20 COMPARISON (4.5 MR) | LLDPE [LL3001.CR1] | 0.918 | 1.00 | HEXENE | 38 (11.6) | 14.0 (35.6) | 38.3 | 30 | 22 |
| 21 COMPARISON (4.5 MR) | LLDPE [DEFD1568] | 0.913 | 0.50 | HEXENE | 45 (13.7) | 8.5 (21.6) | 26.6 | 35 | 23 |
| 22 COMPARISON (4.5 MR) | LLDPE [DEFD1569] | 0.912 | 1.00 | HEXENE | 40 (12.2) | 8.0 (20.3) | 21.5 | 35 | 23 |
| 23 COMPARISON (4.5 MR) | LLDPE [DEFD1623] | 0.915 | 1.00 | HEXENE | 53 (16.2) | 8.0 (20.3) | 22.0 | 33 | 21 |
| 24 COMPARISON (4.5 MR) | LLDPE [DEFD1624] | 0.914 | 0.50 | HEXENE | 60 (18.3) | 9.0 (20.3) | 27.0 | 32 | 22 |
| 25 COMPARISON (4.5 MR) | LLDPE [DEFD1626] | 0.911 | 0.80 | HEXENE | 57 (17.4) | 8.0 (20.3) | 27.0 | 34 | 22 |
| 26 COMPARISON (4.5 MR) | LLDPE [DEFD1627] | 0.912 | 0.80 | HEXENE | 57 (17.4) | 8.0 (20.3) | 25.0 | 35 | 22 |
| 27 COMPARISON (4.5 MR) | LLDPE [DEFD1628] | 0.915 | 0.80 | HEXENE | 55 (16.8) | 9.0 (22.9) | 27 | 34 | 22 |
| 28 (4.5 MR) | LLDPE [DEFD1630] | 0.913 | 0.50 | HEXENE | 52 (15.8) | 6.0 (15.2) | 14.0 | 34 | 21 |
| 29 COMPARISON (4.5 MR) | LLDPE [DEFD1567] | 0.913 | 1.00 | BUTENE | 34 (10.4) | 6.5 (16.5) | 21.1 | 37 | 23 |
| 30 COMPARISON (4.5 MR) | LLDPE [DEFD1565] | 0.912 | 0.50 | BUTENE | 50 (15.2) | 8.5 (21.6) | 28.1 | 39 | 24 |
| 31A COMPARISON (4 MR) | VLDPE [1137] | 0.906 | 0.80 | BUTENE | 56 (17.1) | 9.0 (22.9) | 22.0 | 35 | 25 |
| 31B COMPARISON (6 MR) | VLDPE [1137] | 0.906 | 0.80 | BUTENE | 60 (18.3) | 10 (25.4) | 23.0 | 35 | 24 |
| 32 COMPARISON (4.5 MR) | VLDPE [1491] | 0.900 | 1.00 | BUTENE | 53 (16.2) | 5 (12.7) | 32.0 | 45 | 30 |

DISCUSSION OF SAMPLES

Controls 1 (layer 2 was EVA) and 2A-2D (layer 2 was LLDPE): (Below they are compared to samples 10-18, samples illustrating the invention.) As can be seen from EVA sample 1, abuse resistance was poor (17.8 cm for dart drop and 25 cm-kg for ball burst), orientation speed was good (57 feet/minute), and % shrink was excellent (44% transverse; 27% longitudinal). As for LLDPE (density=0.920; comonomer=octene) Control Samples 2A-2D, abuse resistance was excellent (38.1 cm and 30.5 cm dart drop for 2A and 2B, respectively) or superior (48.3 cm and 50.8 cm for 2C and 2B, respectively), orientation was good (between 46 and 60 feet/minute), and shrink ranged from excellent (34% T, 23% L for 2A and 32% T, 22% L for 2B) to good (28% T, 16% L for 2C and 28% T, 18% L for 2D). For the LLDPE samples compared with EVA control sample 1, abuse resistance was far better, % shrink was not as good, and orientation speed was similar. In summary, with LLDPE abuse resistance improves and shrink worsens, whereas with EVA shrink improves and abuse resistance worsens.

Samples 3-6: These were other comparative samples wherein layer 2 was LLDPE having octene as the comonomer, like the LLDPE control samples 2A-2D. Samples 3-6 had orientation substantially similar, abuse resistance far worse, and % shrink inconsistent as compared to control samples 2A-2D.

Samples 7-9: These were samples wherein layer 2 was VLDPE having octene as the comonomer, but having a high MI for 2.2 for samples 8 and 9 and a high MI of 3.3 for samples 7A and 7B. Their performance properties of orientation (49 to 56 feet/minute) and % shrink were also substantially similar to those of LLDPE control samples 2A-2D, except that sample 8 had a better shrink (41% T, 29% L). As for their abuse resistance, it was not as high as that of LLDPE control samples 2A-2D. Furthermore, it is noted that these VLDPE samples 7-9, wherein the VLDPE had a high MI, did not exhibit the excellent orientation of the samples of the invention, samples 10-18, discussed in the next 2 paragraphs below.

Samples 10-17: These were samples of the preferred embodiment. They were samples wherein layer 2 was VLDPE having octene as the comonomer and a low MI under about 2.0. For these samples, all of the 3 performance properties, orientation, % shrink and abuse resistance were consistently excellent. On the other hand as mentioned above, for a particular control sample, one or two of the 3 properties were good or excellent but never were all 3 properties excellent for a particular control sample.

Sample 18: This was another sample of the preferred embodiment. It was a sample wherein layer 2 was VLDPE having hexene as the comonomer and a low MI under about 2. As in samples 10-17, orientation, % shrink and abuse resistance were excellent.

Samples 19-28: These were other comparative samples wherein layer 2 was LLDPE having hexene as the comonomer. Their performance properties of orientation (except for sample 20 which had a poor orientation of 38 feet/minute) and % shrink were substantially similar to those of LLDPE control samples 2A-2D, but their abuse resistance (except for sample 20 which had a Carson Dart Drop of 35.6 cm) was not as high as that of 2A-2D. In fact, for sample 28, abuse resistance was a poor 15.2 cm.

Samples 29-32: These were samples wherein layer 2 was LLDPE and VLDPE having butene as the comonomer. Except for sample 29 which had a poor orientation of only 34 feet/minute, their performance properties of orientation and % shrink were also substantially similar to those of LLDPE control samples 2A-2D. But for all of 29-32, their abuse resistance was not as high as that of controls 2A-2D, and for some of them, namely samples 29 and 32, abuse resistance was poor, namely Carson Dart Drop of 16.5 cm and 12.7 cm, respectively.

In summary, EVA Control 1 had excellent shrink (44% transverse; 27% longitudinal), good orientation (57 feet/minute), and poor abuse resistance (7 cm for dart drop and 25 cm-kg for ball burst). On the other hand, the orientation speed of LLDPE Controls 2A-2D was good (46-60 feet/minute), the abuse resistance (Carson Dart Drop was 30.5 to 50.8 cm) of Controls 2A-2D ranged from excellent to superior, and the shrink (for instance, 28% transverse and 16% longitudinal for 2C) was good. It has been surprisingly discovered that for samples 10-18, wherein the polymer in layer 2 was VLDPE having a MI below about 2.0, the films exhibited excellent abuse resistance, excellent shrink and excellent orientation speed. Thus, for samples 10-18, all 3 performance properties were excellent.

EXAMPLE II

Films were made as in Example I except saran-MA was employed for barrier layer 3, and the polymers were varied in each of layers 1, 2, and 4. The following films were made:

TABLE II-A

| SAMPLE NUMBER AND IRRAD OF LAYERS 1 AND 2 (MR) | SUBSTRATE LAYERS | | EXTRUSION COATED LAYERS | |
|---|---|---|---|---|
| | SEALING LAYER 1 | LAYER 2 | BARRIER LAYER 3 | OUTSIDE LAYER 4 |
| 1 (4.5 MR) | LLDPE (0.912) [Dowlex 4002] | EVA (18% VA) [LD720.62] | SARAN-MA | 80% LLDPE (0.912) [Dowlex 4001]; 20% EBA |
| 2 (4.5 MR) | LLDPE (0.912) [Dowlex 4002] | EVA (18% VA) [LD720.62] | SARAN-MA | 40% LLDPE (0.912) [Dowlex 4001]; 40% LLDPE (0.912) [Dowlex 4002]; 20% EBA |
| 3 (4.5 MR) | LLDPE (0.912) [Dowlex 4002] | EVA (18% VA) [LD720.62] | SARAN-MA | 80% LLDPE (0.911) [Stamylex 08026]; 20% EBA |
| 4 (4.5 MR) | LLDPE (0.912) [Dowlex 4002] | EVA (18% VA) [LD720.62] | SARAN-MA | 80% LLDPE (0.912) [Dowlex 4002]; 20% EBA |
| 5 (4.5 MR) | LLDPE (0.912) [Dowlex 4002] | EVA (18% VA) [Elvax 3165] | SARAN-MA | 80% LLDPE (0.912) [Dowlex 4002]; 20% EBA |
| 6 (4.5 MR) | LLDPE (0.912) [Dowlex 4002] | EVA (18% VA) [LD720.62] | SARAN-MA | 80% VLDPE (0.908; MI = 3.3) [XPR054-33260-46L]; 20% EBA |
| 7 (4.5 MR) | LLDPE (0.912) [Dowlex 4002] | EVA (18% VA) [LD720.62] | SARAN-MA | 80% VLDPE (0.905; MI = 0.8) [XU61512.08L]; 20% EBA |
| 8 (4.5 MR) | LLDPE (0.912) [Dowlex 4002] | 80% VLDPE (0.905; MI = 0.8) [XU61512.08L]; 20% EBA | SARAN-MA | 80% VLDPE (0.905; MI = 0.8) [XU61512.08L]; 20% EBA |
| 9 (4.5 MR) | LLDPE (0.912) [Dowlex 4002] | 80% VLDPE (0.905; MI = 0.8) [XU61512.08L]; 20% EBA | SARAN-MA | 80% VLDPE (0.908; MI = 3.3) [XPR0545-33260-46L]; 20% EBA |

TABLE II-B

| SAMPLE NUMBER | ORIENTATION SPEED FT/MIN (M/MIN) | ABUSE RESISTANCE CARSON DART DROP INCHES (CM) | % SHRINK 185° F. (85° C.) TRANSVERSE | LONGITUDINAL |
| --- | --- | --- | --- | --- |
| 1* | 65 (19.8) | 6 (15.2) | 45 | 35 |
| 2* | 55 (16.8) | 6 (15.2) | 44 | 34 |
| 3* | 61 (18.6) | 7 (18) | 46 | 35 |
| 4* | 49 (14.9) | 5 (13) | 45 | 34 |
| 5* | 43 (13.1) | 6 (15.2) | 44 | 32 |
| 6* | 50 (15.2) | 6 (15.2) | 48 | 35 |
| 7 | 70 (21.3) | 6 (15.2) | 49 | 34 |
| 8 | 71 (21.6) | 10 (25.4) | 42 | 26 |
| 9 | 70 (21.3) | 8 (20) | 40 | 24 |

*Comparison Samples 1–6.

As can be seen from Tables IIA–B, the three properties, namely orientation, % shrink and abuse resistance were consistently excellent for samples 8 and 9. These were samples wherein layer 2 comprised a VLDPE having octene as the comonomer and a low MI under about 2. It is noted that for these samples 8 and 9, the VLDPE of layer 2 was in blend with another polymer compatible therewith, herein EBA. Nevertheless, the three properties of samples 8 and 9 of Table II were all three consistently excellent. From this it can be concluded that a film comprising VLDPE having octene as the comonomer and a low MI of about 2 or less will have all 3 properties of orientation speed, abuse resistance and % shrink be excellent even when the VLDPE layer is VLDPE in blend with another polymer compatible therewith.

It is further noted in particular for sample 9 of Tables IIA and B, that the VLDPE employed in outside layer 4, resin XPR054-33260-46L which had octene as the comonomer but had a high MI=3.3, was also the same VLDPE employed in interior layer 2 of samples 7A and 7B of Table I, yet sample 9 had an excellent orientation speed of 70 feet/minute, whereas samples 7A and 7B had only a good orientation speed of only 50 feet/minute. This is because sample 9 of Tables IIA and B also had a VLDPE layer, namely layer 2, wherein the VLDPE was resin XU61512.08L having octene as the comonomer but having a low MI, i.e. the MI was 0.8. No such layer with VLDPE having a low MI was present in samples 7A and 7B of Table I and that is why they did not exhibit an excellent orientation.

As for sample 7 in Tables IIA–B compared to sample 9 in Table I, it is noted that each had a layer (layer 4 of sample 7 and layer 2 of sample 9) of the same VLDPE [resin XU61512.08L] having octene as the comonomer and having a low MI=0.8, and each exhibited comparable excellent orientation speed and % shrink. Sample 7 of Tables IIA–B, however, exhibited a poor abuse resistance (Carson Dart Drop=15.2 cm), whereas sample 9 of Table I exhibited excellent abuse resistance (Carson Dart Drop=25.4 cm). While it is not intended to be bound to any theory, it is believed this is due to the VLDPE layer of sample 7 having a before-orientation thickness of only 6.5 mils, whereas the VLDPE layer of sample 9 had a before-orientation thickness of 14.5 mils. It is believed if sample 7 were repeated but with its VLDPE layer being 14.5 mils thick, then good abuse resistance would be obtained too.

While certain representative embodiments and details have been shown for the purpose of illustration, numerous modifications to the formulations described above can be made without departing from the invention disclosed.

What is claimed is:

1. A thermoplastic, multilayer, heat-shrinkable packaging film comprising at least one layer of a copolymer of ethylene and an alpha-olefin with 6 or more carbon atoms per molecule, said ethylene/alpha-olefin copolymer having a density of about 0.910 g/cc or less and a melt index of about 2 or less.

2. The film of claim 1, wherein said copolymer of ethylene and an alpha-olefin with 6 or more carbon atoms per molecule is in blend with another polymer up to 50% by weight, based on the layer composition, of a polymer which is compatible with said ethylene/alpha-olefin copolymer and is selected from ethylene/alkyl-acrylate copolymer, linear low density polyethylene (LLDPE), high density polyethylene (HDPE), linear medium density polyethylene (LMDPE), linear high density polyethylene (LHDPE), low density polyethylene (LDPE), medium density polyethylene (MDPE), ethylene/vinyl acetate (EVA), acid-modified EVA, polypropylene, ethylene/propylene copolymers, copolymers of an alpha-olefin having the formula $RHC{=}CH_2$ wherein R is H or $C_1$ to $C_8$ alkyl and an alpha, beta-ethylinically unsaturated carboxylic acid, and mixtures thereof.

3. The film of claim 1 further including a barrier layer.

4. The film of claim 1 wherein said at least one layer of copolymer of ethylene/alpha-olefin is an interior layer.

5. The film of claim 1 wherein said at least one layer of ethylene/alpha-olefin copolymer has been irradiated at a dosage up to about 20 MR.

6. A thermoplastic, multi-layer, heat-shrinkable packaging film having excellent abuse resistance, shrink and orientation properties comprising an outside polymer layer, a heat sealing layer and an interior layer between said sealing and said outside layers, wherein said interior layer comprises a copolymer of ethylene and an alpha-olefin with 6 or more carbon atoms per molecule, said ethylene/alpha-olefin copolymer having a density of about 0.910 g/cc or less and a melt index of about 2 or less.

7. The film of claim 6, wherein said interior layer further includes up to 50% by weight, based on the layer composition, of a polymer which is compatible with said ethylene/alpha-olefin copolymer and is selected from ethylene/alkyl-acrylate copolymer, linear low density polyethylene (LLDPE), high density polyethylene (HDPE), linear medium density polyethylene (LMDPE), linear high density polyethylene (LHDPE), low density polyethylene (LDPE), (MDPE) medium density polyethylene (MDPE) ethylene/vinyl acetate (EVA), acid-modified EVA, polypropylene, ethylene/- propylene copolymers, copolymers of an alpha-olefin having the formula $RHC=CH_2$ wherein R is H or $C_1$ to $C_8$ alkyl and an alpha, beta-ethylenically unsaturated carboxylic acid, and mixtures thereof.

8. The film of claim 6 further including a barrier layer between said sealing layer and said outside layer.

9. The film of claim 6 wherein said interior layer has been irradiated at a dosage up to about 20 MR.

10. A process for manufacturing thermoplastic, multi-layer, heat-shrinkable packaging film comprising (I) extruding at least one layer of a copolymer of ethylene and an alpha-olefin with 6 or more carbon atoms per molecule, said ethylene/alpha-olefin copolymer having a density of about 0.910 g/cc or less and a melt index less of about 2 or less, (II) orienting the extruded polymer in at least one direction, and (III) recovering a heat-shrinkable polymeric film.

11. The process of claim 10 further including extruding a barrier layer prior to the orienting step.

12. The process of claim 10 wherein said copolymer of ethylene and an alpha-olefin with 6 or more carbon atoms per molecule is in blend with another polymer up to 50% by weight, based on the layer composition, of a polymer which is compatible with said ethylene/alpha-olefin copolymer and is selected from ethylene/alkyl-acrylate copolymer, linear low density polyethylene (LLDPE), high density polyethylene (HDPE), linear medium density polyethylene (LMDPE), linear high density polyethylene (LHDPE), low density polyethylene (LDPE), medium density polyethylene (MDPE), ethylene/vinyl acetate (EVA), acid-modified EVA, polypropylene, ethylene/propylene copolymers, copolymers of an alpha-olefin having the formula $RHC=CH_2$ wherein R is H or $C_1$ to $C_8$ alkyl and an alpha, beta-ethylinically unsaturated carboxylic acid, and mixtures thereof.

13. The process of claim 10 further including irradiating said layer of ethylene/alpha-olefin copolymer at a dosage up to about 20 MR prior to the orienting step.

14. A thermoplastic, multi-layer, heat-shrinkable packaging film comprising at least one layer of a copolymer of ethylene and an alpha-olefin with 6 or more carbon atoms per molecule, said ethylene/alpha-olefin copolymer having a density of about 0.910 g/cc or less and a melt index of about 2 or less, wherein said film exhibits excellent abuse resistance characteristics, excellent shrink characteristics, and excellent orientation characteristics.

15. A bag formed from the film of claim 1, said bag having end seal(s), side seal(s), or a combination thereof.

16. The bag of claim 15 further including a barrier layer.

17. The bag of claim 15 wherein at least one layer of copolymer of ethylene/alpha-olefin is an interior layer.

* * * * *

UNITED STATES PATENT AND TRADEMARK OFFICE
CERTIFICATE OF CORRECTION

PATENT NO. : 4,837,084
DATED : June 6, 1989
INVENTOR(S) : Thomas C. Warren

It is certified that error appears in the above-identified patent and that said Letters Patent is hereby corrected as shown below:

In column 20, line 18 after "film" and in front of "comprising", insert --having excellent abuse resistance, shrink and orientation properties--.

In column 21, line 10 after "film" and in front of "comprising", insert --having excellent abuse resistance, shrink and orientation properties--.

Signed and Sealed this

Twentieth Day of October, 1992

*Attest:*

DOUGLAS B. COMER

*Attesting Officer*  *Acting Commissioner of Patents and Trademarks*